United States Patent
Prakash et al.

(10) Patent No.: US 9,985,724 B2
(45) Date of Patent: May 29, 2018

(54) HORIZONTAL SYNCHRONIZATION EXTENSIONS FOR SERVICE RESIZING IN OPTICAL NETWORKS

(71) Applicant: Ciena Corporation, Hanover, MD (US)

(72) Inventors: Anurag Prakash, Noida (IN); Dominic Richens, Perth (CA); Mohit Chhillar, Pitam Pura (IN); Rishi Malik, Karol Bagh (IN)

(73) Assignee: Ciena Corporation, Hanover, MD (US)

( * ) Notice: Subject to any disclaimer, the term of this patent is extended or adjusted under 35 U.S.C. 154(b) by 0 days. days.

(21) Appl. No.: 15/332,103

(22) Filed: Oct. 24, 2016

(65) Prior Publication Data
US 2018/0076882 A1   Mar. 15, 2018

(30) Foreign Application Priority Data
Sep. 9, 2016 (IN) .............................. 201611030817

(51) Int. Cl.
*H04B 10/03* (2013.01)
*H04L 7/00* (2006.01)

(52) U.S. Cl.
CPC ........... *H04B 10/03* (2013.01); *H04L 7/0075* (2013.01)

(58) Field of Classification Search
CPC .............................. H04B 10/03; H04L 7/0075
USPC ............................................................ 398/1
See application file for complete search history.

(56) References Cited

U.S. PATENT DOCUMENTS

| | | | |
|---|---|---|---|
| 6,990,070 B1 * | 1/2006 | Aweya ..................... | H04L 47/10 370/230 |
| 8,666,247 B2 | 3/2014 | Srinivasan et al. | |
| 8,682,160 B2 | 3/2014 | Prakash et al. | |
| 8,761,024 B2 | 6/2014 | Ihang et al. | |
| 8,818,198 B2 | 8/2014 | Trnkus et al. | |
| 8,854,955 B2 | 10/2014 | Prakash et al. | |
| 9,172,658 B2 | 10/2015 | Kakkar et al. | |
| 9,236,953 B2 | 1/2016 | Chhillar et al. | |
| 9,407,359 B2 | 8/2016 | Swinkels et al. | |
| 9,735,934 B2 * | 8/2017 | Futaki ................... | H04L 5/0037 |

(Continued)

OTHER PUBLICATIONS

A. Doria et al., General Switch Management Protocol (GSMP) Applicability, Network Working Group, Informational Memo, The Internet Society, Jun. 2002, pp. 1-9.

(Continued)

*Primary Examiner* — Oommen Jacob
(74) *Attorney, Agent, or Firm* — Clements Bernard Walker PLLC; Christopher L. Bernard; Lawrence A. Baratta, Jr.

(57) ABSTRACT

Systems and methods for horizontal synchronization are implemented by a first node with a second node adjacent to the first node in a network with a control plane. The horizontal synchronization manages and corrects for a state of a service which is resizable. The systems and methods include providing a first horizontal synchronization message to the second node with a first state comprising the state of the service at the node and a first size comprising a size of the service at the node; receiving a second horizontal synchronization message from the second node with a second state comprising the state of the service at the second node and a second size comprising a size of the service at the second node; detecting a mismatch of the service with the second node based on the second horizontal synchronization message; and performing a recovery action to correct the mismatch.

17 Claims, 6 Drawing Sheets

(56) References Cited

U.S. PATENT DOCUMENTS

| | | | | |
|---|---|---|---|---|
| 2004/0174570 | A1* | 9/2004 | Plunkett | B41J 2/04505 358/3.13 |
| 2006/0133383 | A1* | 6/2006 | Homer | H04L 12/422 370/395.3 |
| 2008/0313330 | A1* | 12/2008 | Miller | G06F 9/5061 709/225 |
| 2010/0110980 | A1* | 5/2010 | Hellwig | H04M 1/253 370/328 |
| 2012/0002965 | A1* | 1/2012 | Bellato | H04J 3/1652 398/52 |
| 2012/0170936 | A1* | 7/2012 | Vissers | H04J 3/1658 398/58 |
| 2012/0224857 | A1* | 9/2012 | Su | H04J 3/1652 398/98 |
| 2013/0004145 | A1* | 1/2013 | Li | H04N 21/4126 386/343 |
| 2013/0101292 | A1* | 4/2013 | Lanzone | H04L 47/25 398/66 |
| 2013/0177305 | A1 | 7/2013 | Prakash et al. | |
| 2013/0308948 | A1 | 11/2013 | Swinkels et al. | |
| 2013/0315592 | A1* | 11/2013 | Sharma | H04B 10/27 398/58 |
| 2014/0056122 | A1* | 2/2014 | Singal | H04L 41/0668 370/220 |
| 2014/0149591 | A1* | 5/2014 | Bhattacharya | H04L 67/1097 709/226 |
| 2014/0149983 | A1* | 5/2014 | Bonilla | G06F 9/45558 718/1 |
| 2015/0023371 | A1* | 1/2015 | Yasuie | H04L 43/0864 370/470 |
| 2015/0092791 | A1* | 4/2015 | Cornett | H04L 1/0002 370/468 |
| 2016/0020850 | A1* | 1/2016 | Youn | H04B 10/032 398/5 |
| 2016/0037239 | A1 | 2/2016 | Chhillar et al. | |
| 2016/0044392 | A1 | 2/2016 | Surek et al. | |
| 2016/0105380 | A1 | 4/2016 | Chhillar et al. | |
| 2016/0164794 | A1* | 6/2016 | Ramalingam | H04L 47/365 370/235 |
| 2016/0254952 | A1* | 9/2016 | Harvey | H04L 41/0846 715/735 |

OTHER PUBLICATIONS

E. Mannie, Generalized Multi-Protocol Label Switching (GMPLS) Architecture, Network Working Group, Standards Track Memo, The Internet Society, Oct. 2004, pp. 1-69.

A. Doria et al., Forwarding and Control Element Separation (ForCES) Protocol Specification, Internet Engineering Task Force (IETF), Standards Track Memo, ISSN: 2070-1721, Mar. 2010, pp. 1-124.

ITU-T, Telecommunication Standardization Sector of ITU, G.694.1, Spectral grids for WDM applications DWDM frequency grid, Feb. 2012, pp. 1-16.

ITU-T, Telecommunication Standardization Sector of ITU, G.709/Y.1331, Interfaces for the optical transport network, Feb. 2012, pp. 1-238.

ITU-T, Telecommunication Standardization Sector of ITU, G.798, Characteristics of optical transport network hierarchy equipment functional blocks, Dec. 2012, pp. 1-390.

ITU-T, Telecommunication Standardization Sector of ITU, G.7044/Y.1347, Hitless adjustment of ODUflex(GFP), Oct. 2011, pp. 1-44.

ITU-T, Telecommunication Standardization Sector of ITU, G.8080/Y.1304, Architecture for the automatically switched optical network, Feb. 2012, pp. 1-124.

* cited by examiner

HORIZONTAL SYNCHRONIZATION EXTENSIONS FOR SERVICE RESIZING IN OPTICAL NETWORKS

CROSS-REFERENCE TO RELATED APPLICATION(S)

The present patent application/patent claims the benefit of priority of Indian Patent Application No. 201611030817, filed on Sep. 9, 2016, and entitled "HORIZONTAL SYNCHRONIZATION EXTENSIONS FOR SERVICE RESIZING IN OPTICAL NETWORKS," the contents of which are incorporated in full by reference herein.

FIELD OF THE DISCLOSURE

The present disclosure generally relates to optical networking systems and methods. More particularly, the present disclosure relates to horizontal synchronization extension systems and methods for service resizing, such as Media Channel (MC) resizing or Optical channel Data Unit Flexible (ODUflex) resizing in optical networks.

BACKGROUND OF THE DISCLOSURE

At Layer 0 (optical, Dense Wave Division Multiplexing (DWDM), etc.) and Layer 1 (Time Division Multiplexing (TDM) such as using Optical Transport Network (OTN)), various techniques are being introduced to support service resizing, dynamically in-service. Service resizing at Layer 0 can include resizing a Media Channel (MC) or Super Channel (SC) in a flexible grid deployment. As described herein, reference is made to the MC which is a group of contiguous spectrum between two nodes in the network which can transport one or more Network Media Carriers (NMC) without requiring dead bands or guard bands between the NMCs. Thus, MC deployments efficiently use the optical spectrum, i.e., no unused, wasted spectrum in the group of contiguous spectrum. For example, given an MC between a source and destination, there will be situations where new NMCs are needed or existing NMCs are removed from the MC where the MC size needs to be changed, in-service. However, existing control planes, Software Defined Networking (SDN), and management platforms do not support efficient recovery from failures associated with resizing MCs. Disadvantageously, such failures in a resizing operation lead to service outages or blocked bandwidth in the network which cannot be recovered unless a specific node restart is initiated along the failure path.

At Layer 1, service resizing can include resizing Optical channel Data Unit flexible (ODUflex) connections. Of note, in-service resizing techniques have been described such as ITU Recommendation G.7044/Y.1347 (10/11) "Hitless adjustment of ODUflex(GFP)," the contents of which are incorporated by reference. Similar to the MC resizing, existing control planes, SDN, and management platforms do not support efficient recovery from failures associated with resizing ODUflex.

Thus, there is a need to provide extensions to existing control planes, SDN, and management platforms to support service resizing and associated failures.

BRIEF SUMMARY OF THE DISCLOSURE

In an exemplary embodiment, a method, implemented by a first node, for horizontal synchronization with a second node adjacent to the first node in a network with a control plane, to manage and correct a state of a service which is resizable includes providing a first horizontal synchronization message to the second node with a first state including the state of the service at the node and a first size including a size of the service at the node; receiving a second horizontal synchronization message from the second node with a second state including the state of the service at the second node and a second size including a size of the service at the second node; detecting a mismatch of the service with the second node based on the second horizontal synchronization message; and performing a recovery action to correct the mismatch. The recovery action can include causing a reversion to a last good state subsequent to a resizing operation. The service can include an optical media channel including a grouping of contiguous optical spectrum, wherein the optical media channel can be resizable to expand or contract the grouping of contiguous optical spectrum, and wherein the size can include an amount of the contiguous optical spectrum and the state indicates current operational state.

The providing can be performed during a resizing operation subsequent to a fault during the resize operation. The service can include one of an Optical channel Data Unit flexible (ODUflex) with the size including a size of the ODUflex, and a Link Aggregation Group (LAG) with the size including a number of members in the LAG. The providing can be performed one or more of subsequent to a fault recovery and periodically. The detecting can include comparing the first state to the second state, and responsive to the first state not matching the second state, the recovery action can include resizing the service to a last good state. The first horizontal synchronization message and the second horizontal synchronization message can include status enquiry messages in the control plane with state and size information included therein. The method can further include, responsive to not detecting the mismatch but the service having a different size at the first node from the second node, causing a release of the service.

In another exemplary embodiment, an apparatus is provided for horizontal synchronization to manage and correct for a state of a service which is resizable, wherein the apparatus is located at a first node in communication with a second node adjacent to the first node in a network with a control plane. The apparatus includes circuitry adapted to provide a first horizontal synchronization message to the second node with a first state including the state of the service at the node and a first size including a size of the service at the node; circuitry adapted to receive a second horizontal synchronization message from the second node with a second state including the state of the service at the second node and a second size including a size of the service at the second node; circuitry adapted to detect a mismatch of the service with the second node based on the second horizontal synchronization message; and circuitry adapted to cause a recovery action to correct the mismatch. The recovery action can include causing a reversion to a last good state subsequent to a resizing operation. The service can include an optical media channel including a grouping of contiguous optical spectrum, wherein the optical media channel can be resizable to expand or contract the grouping of contiguous optical spectrum, and wherein the size can include an amount of the contiguous optical spectrum and the state indicates current operational state.

The first horizontal synchronization message can be provided during a resizing operation subsequent to a fault during the resize operation. The service can include one of an Optical channel Data Unit flexible (ODUflex) with the size including a size of the ODUflex, and a Link Aggregation Group (LAG) with the size including a number of members in the LAG. The first horizontal synchronization message can be provided one or more of subsequent to a fault recovery and periodically. The circuitry adapted to detect can be adapted to compare the first state to the second state, and responsive to the first state not matching the second state, the recovery action can include resizing the service to a last good state. The first horizontal synchronization message and the second horizontal synchronization message can include status enquiry messages in the control plane with state and size information included therein. The apparatus can include circuitry adapted to cause a release of the service responsive to not detecting the mismatch but the service having a different size at the first node from the second node.

In a further exemplary embodiment, a node is in a network with a control plane communicatively coupled to a second node adjacent thereto, wherein the node is adapted to perform horizontal synchronization to manage and correct for a state of a service which is resizable. The node includes one or more ports; and a controller communicatively coupled to the one or more ports and adapted to provide a first horizontal synchronization message to the second node with a first state including the state of the service at the node and a first size including a size of the service at the node, receive a second horizontal synchronization message from the second node with a second state including the state of the service at the second node and a second size including a size of the service at the second node, detect a mismatch of the service with the second node based on the second horizontal synchronization message, and cause a recovery action to correct the mismatch. The recovery action can include causing a reversion to a last good state subsequent to a resizing operation.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to horizontal synchronization extension systems and methods for service resizing, such as Media Channel (MC) resizing or Optical channel Data Unit Flexible (ODUflex) resizing in optical networks. Variously, the systems and methods are referred to as horizontal synchronization in that it operates between nodes in the network, i.e., horizontally, to ensure a service is sized properly. The horizontal synchronization can also be referred to as a call status enquiry, between nodes. In the event of a mismatch, the systems and methods include reversion back to a last known stable state, i.e., size, of the service. The systems and methods address the problem of communication failures during a resizing operation, providing a technique for recovery to ensure any failures do not result in traffic outages or network bandwidth lockout. The horizontal synchronization can also be used during normal operations to ensure consistency in the provisioning of the services between nodes. In an exemplary embodiment, the systems and methods include extensions to various call status enquiry protocol negotiation and recovery which is used in most control plane implementations. The call status enquiry protocol negotiation and recovery are set to be state based where failures cause reversion back to the last known good state (or previously established stable state) of a service.

Exemplary Network

Figure 1:
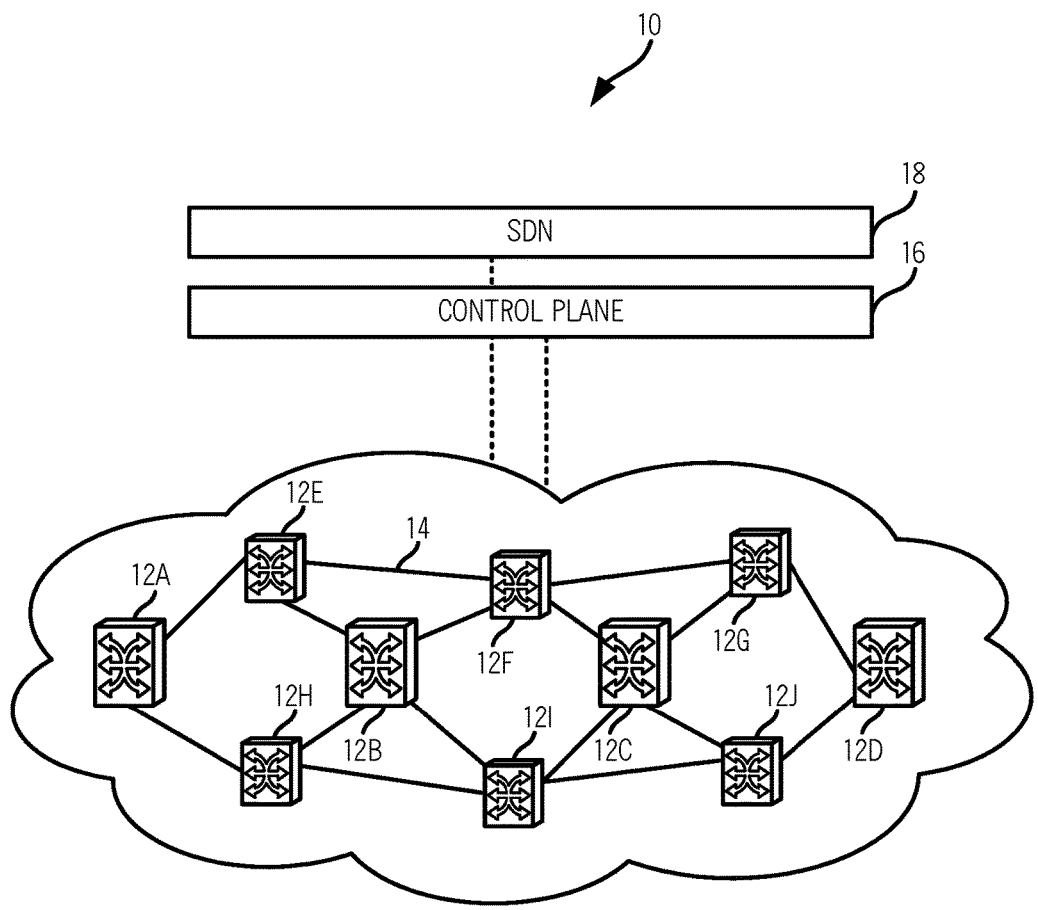
FIG. 1 is a network diagram of an exemplary network with various interconnected nodes for describing the control plane routing systems and methods for pervasive maintenance.
Figure 2:
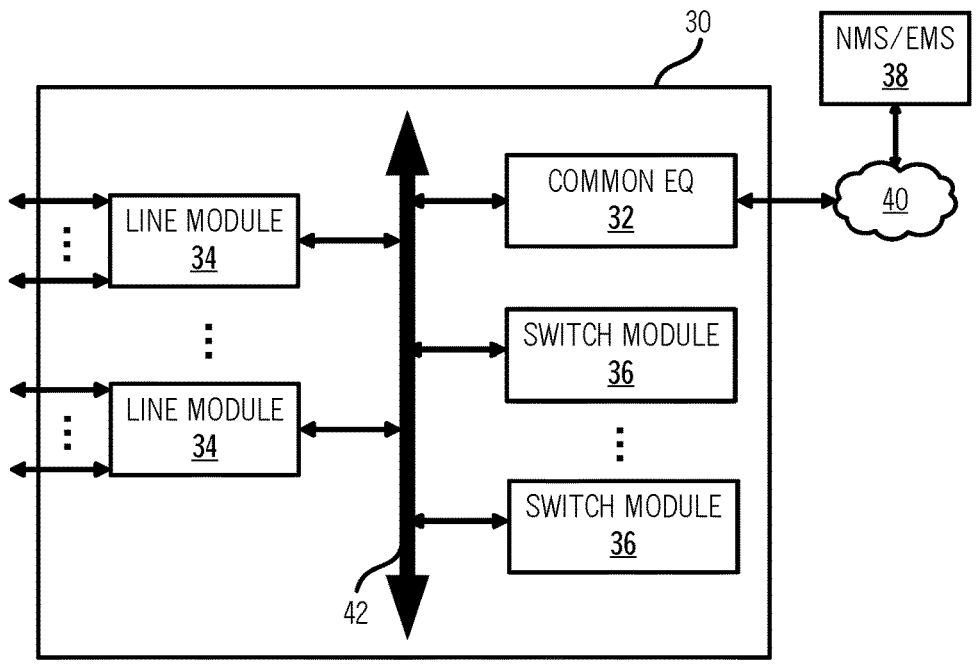
FIG. 2 is a block diagram of an exemplary node for use with the systems and methods described herein.

Referring to FIG. 1, in an exemplary embodiment, a network diagram illustrates an exemplary network 10 with various interconnected nodes 12 (illustrated as nodes 12A-12J) for describing the horizontal synchronization extension systems and methods. The nodes 12 are interconnected by a plurality of links 14. The nodes 12 communicate with one another over the links 14 through Layer 0 (L0) such as Dense Wavelength Division Multiplexing (DWDM), Layer 1 (L1) such as Optical Transport Network (OTN), Layer 2 (L2) such as Ethernet, Multiprotocol Label Switching (MPLS), etc., Layer 3 (L3) protocols, and/or combinations thereof. For the disjoint path computation systems and methods, the links 14 include DWDM (L0) and optionally OTN (L1) or some other Time Division Multiplexing (TDM) protocol over DWDM. In the present disclosure, the links 14 can be Optically Multiplexed Sections (OMSs) for DWDM carriers including MCs. The nodes 12 can be network elements which include a plurality of ingress and egress ports forming the links 14. An exemplary node implementation is illustrated in FIG. 2. The network 10 can include various services or calls between the nodes 12. Each service or call can be at any of the L0, L1, L2, and/or L3 protocols, such as a wavelength, a Subnetwork Connection (SNC), a Label Switched Path (LSP), etc., and each service or call is an end-to-end path or an end-to-end signaled path and from the view of the client signal contained therein, it is seen as a single network segment. The systems and methods described herein relate to services which support in-service resizing, such as MCs, ODUflex, etc. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc. as well as with various different interconnection topologies and architectures.

The network 10 can include a control plane 16 operating on and/or between the nodes 12. The control plane 16 includes software, processes, algorithms, etc. that control configurable features of the network 10, such as automated discovery of the nodes 12, capacity on the links 14, port availability on the nodes 12, connectivity between ports; dissemination of topology and bandwidth information between the nodes 12; calculation and creation of paths for calls or services; network level protection and restoration; and the like. In an exemplary embodiment, the control plane 16 can utilize Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) which is an optical signaling and routing protocol from Ciena Corporation similar to PNNI (Private Network-to-Network Interface) and MPLS; or any other type control plane for controlling network elements at multiple layers, and establishing and maintaining connections between nodes. The control plane 16 is configured to establish end-to-end signaled connections such as Subnetwork Connections (SNCs) in ASON or OSRP and Label Switched Paths (LSPs) in GMPLS and MPLS. Note, as described herein, SNCs and LSPs can generally be referred to as services or calls in the control plane 160. The control plane 16 uses the available paths to route the services and programs the underlying hardware accordingly. Those of ordinary skill in the art will recognize the network 10 and the control plane 16 can utilize any type of control plane for controlling the nodes 12 and establishing, maintaining, and restoring calls or services between the nodes 12.

A Software Defined Networking (SDN) controller 18 can also be communicatively coupled to the network 10 through one or more of the nodes 12. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. The SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a standard northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports. Examples of SDN include OpenFlow (www.opennetworking.org), General Switch Management Protocol (GSMP) defined in RFC 3294 (June 2002), and Forwarding and Control Element Separation (ForCES) defined in RFC 5810 (March 2010), the contents of all are incorporated by reference herein.

Note, the network 10 can use the control plane 16 separately from the SDN controller 18. Conversely, the network 10 can use the SDN controller 18 separately from the control plane 16. Also, the control plane 16 can operate in a hybrid control mode with the SDN controller 18. In this scheme, for example, the SDN controller 18 does not necessarily have a complete view of the network 10. Here, the control plane 16 can be used to manage services in conjunction with the SDN controller 18. The SDN controller 18 can work in conjunction with the control plane 16 in the sense that the SDN controller 18 can make the routing decisions and utilize the control plane 16 for signaling thereof. In the terminology of ASON and OSRP, SNCs are end-to-end signaled paths or calls since from the point of view of a client signal; each is a single network segment. In GMPLS, the connections are an end-to-end path referred to as LSPs. In SDN, such as in OpenFlow, services are called "flows." In the various descriptions herein, reference is made to SNC or SNCP for illustration only of an exemplary embodiment of the systems and methods. Those of ordinary skill in the art will recognize that SNCs, LSPs, flows, or any other managed service in the network can be used with the systems and methods described herein for end-to-end paths.

Exemplary Network Element/Node

Referring to FIG. 2, in an exemplary embodiment, a block diagram illustrates an exemplary node 30 for use with the systems and methods described herein. In an exemplary embodiment, the exemplary node 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another exemplary embodiment, the node 30 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 30 can be any digital system with ingress and egress digital signals and switching of channels, timeslots, tributary units, etc. While the node 30 is generally shown as an optical network element, the systems and methods contemplated for use with any switching fabric, network element, or network based thereon.

In an exemplary embodiment, the node 30 includes common equipment 32, one or more line modules 34, and one or more switch modules 36. The common equipment 32 can include power; a control module; operations, administration, maintenance, and provisioning (OAM&P) access; user interface ports; and the like. The common equipment 32 can connect to a management system 38 through a data communication network 40 (as well as a Path Computation Element (PCE), SDN controller, OpenFlow controller, etc.). The management system 38 can include a network management system (NMS), element management system (EMS), or the like. Additionally, the common equipment 32 can include a control plane processor, such as a controller 50 illustrated in FIG. 3 configured to operate the control plane as described herein. The node 30 can include an interface 42 for communicatively coupling the common equipment 32, the line modules 34, and the switch modules 36 to one another. For example, the interface 42 can be a backplane, midplane, a bus, optical or electrical connectors, or the like. The line modules 34 are configured to provide ingress and egress to the switch modules 36 and to external connections on the links to/from the node 30. In an exemplary embodiment, the line modules 34 can form ingress and egress switches with the switch modules 36 as center stage switches for a three-stage switch, e.g. a three-stage Clos switch. Other configurations and/or architectures are also contemplated. The line modules 34 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 34 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 34 can include wavelength division multiplexing interfaces, short reach interfaces, and the like, and can connect to other line modules 34 on remote network elements, end clients, edge routers, and the like, e.g. forming connections on the links in the network 10. From a logical perspective, the line modules 34 provide ingress and egress ports to the node 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 36 can include Time Division Multiplexed (TDM) (i.e., circuit switching) and/or packet switching engines. The switch modules 36 can include redundancy as well, such as 1:1, 1:N, etc. In an exemplary embodiment, the switch modules 36 provide OTN switching and/or Ethernet switching.

Those of ordinary skill in the art will recognize the node 30 can include other components which are omitted for illustration purposes, and that the systems and methods described herein are contemplated for use with a plurality of different network elements with the node 30 presented as an exemplary type of network element. For example, in another exemplary embodiment, the node 30 may not include the switch modules 36, but rather have the corresponding functionality in the line modules 34 (or some equivalent) in a distributed fashion. For the node 30, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 30 is merely presented as one exemplary node 30 for the systems and methods described herein.

Exemplary Controller

Figure 3:
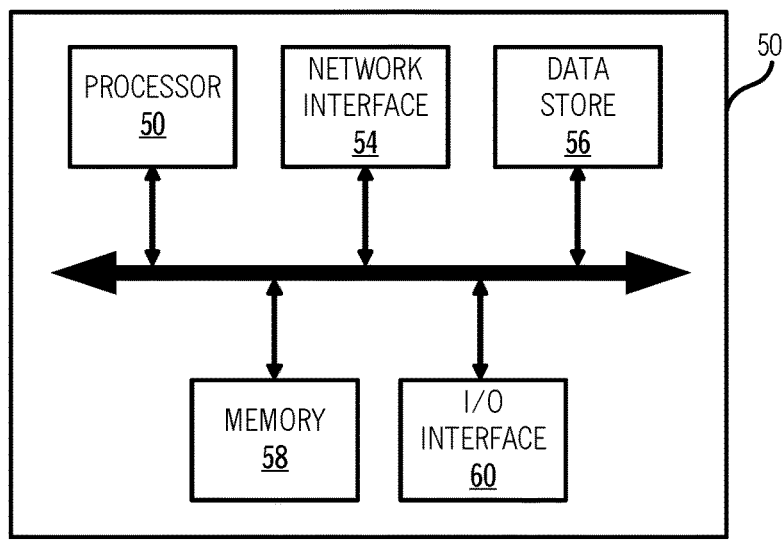
FIG. 3 is a block diagram of a controller to provide control plane processing and/or operations, administration, maintenance, and provisioning (OAM&P) for the node, and/or to implement a Software Defined Networking (SDN) controller.

Referring to FIG. 3, in an exemplary embodiment, a block diagram illustrates a controller 50 to provide control plane processing and/or operations, administration, maintenance, and provisioning (OAM&P) for the node 30, and/or to implement a Software Defined Networking (SDN) controller. The controller 50 can be part of the common equipment, such as common equipment 32 in the node 30, or a stand-alone device communicatively coupled to the node 30 via the DCN 40. In a stand-alone configuration, the controller 50 can be an SDN controller, an NMS, a PCE, etc. The controller 50 can include a processor 52 which is a hardware device for executing software instructions such as operating the control plane. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from the memory, and to generally control operations of the controller 50 pursuant to the software instructions. The controller 50 can also include a network interface 54, a data store 56, memory 58, an I/O interface 60, and the like, all of which are communicatively coupled to one another and to the processor 52.

The network interface 54 can be used to enable the controller 50 to communicate on the DCN 40, such as to communicate control plane information to other controllers, to the management system 38, to the nodes 30, and the like. The network interface 54 can include, for example, an Ethernet card or a wireless local area network (WLAN) card. The network interface 54 can include address, control, and/or data connections to enable appropriate communications on the network. The data store 56 can be used to store data, such as control plane information, provisioning data, OAM&P data, etc. The data store 56 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with OTN signals.

In an exemplary embodiment, the controller 50 is configured to communicate with other controllers 50 in the network 10 to operate the control plane for control plane signaling. This communication may be either in-band or out-of-band. For SONET networks and similarly for SDH networks, the controllers 50 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 50 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels may be used for in-band signaling or routing to carry control plane traffic. Other mechanisms are also contemplated for control plane signaling as well as for SDN controller communication.

The controller 50 is configured to operate the control plane 16 in the network 10. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane is a distributed control plane; thus, a plurality of the controllers 50 can act together to operate the control plane using the control plane signaling to maintain database synchronization. In source-based routing, the controller 50 at a source node for a connection is responsible for path computation and establishing by signaling other controllers 50 in the network 10, such as through a SETUP message. For example, the source node and its controller 50 can signal a path through various techniques. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc.

MC Channel Resizing

MC Resizing is driven optimally utilize the optical spectrum in the network 10. With advanced coherent modulation and detection techniques, multiple channels (i.e., NMCs) can be placed closer (even adjacent) to one another without the need of dead band filtering required by the Wavelength Selective Switch (WSS) filters between the source and destination. Thus, an efficient super channel can be constructed by expanding an existing MC. In a similar manner, removing carriers from the super channel can also contract an MC. Again, as described herein, an MC is a group of contiguous spectrum between two nodes 12 in the network 10. Other terminology may be used including a super channel, a spectrum block, etc. The expansion of an MC is equivalent to a resize operation of a service. As channels are added or deleted for the MC, the spectrum used for dead bands and guard bands can change, thereby optimizing the spectral usage. Therefore, the systems and methods apply to all service/Media channel resize operations.

The foregoing descriptions of the horizontal synchronization systems and methods make reference to MC resizing as an exemplary embodiment. Those of ordinary skill in the art will recognize the horizontal synchronization systems and methods could generally apply to any service resizing in the network 10 including ODUflex or the like.

Of note, the MC resizing is not atomic in nature across the network 10, rather it is driven by the control plane signaling in two steps, for example for an MC resizing operation, 1) resize (expand) the MC across the network route on all of the nodes 12 via a notify message or equivalent, and 2) add the required NMC carrier similar to how any new carrier is added to the MC. The problem with this conventionally can be defined as: "If any of the following errors occur, namely a node or line card reboot, a communication failure across the route, a line fault for Permanent MC expansion signaling, etc., the MC on the two ends of an OMS link will have a mismatch in MC width." Accordingly, the systems and methods provide enhancement/extension to horizontal synchronization for a state validation (e.g., service size) in addition to merely an existence validation (e.g., is the service provisioned?). That is, the systems and methods enhance the control plane horizontal synchronization mechanism to detect and synchronize connection point states and parameters across the two ends of the link 14; not just existence.

Specifically, control plane signaling has multiple failure points including, for example, line card reboots, node reboots, communication failures, and other link faults. Conventionally, a status enquiry, i.e., a call status enquiry (again, also known as horizontal synchronization, is initiated after an associated condition recovers. The existing approach releases the call if some node 12 did not have the provisioning/records or if there is a mismatch. So the call/service would be torn down as a monolithic block. Of course, this existing approach leads to service outages and significant risk thereof in service resizing.

Any end to end acknowledgment (ACK) based signaling solutions can also fail since failures can happen for ACKs as well. Secondly, hop based ACK mechanisms also fail to provide an atomic behavior. Thus, the systems and methods revert back to a last known stable state before resizing. For MC resizing, this is equivalent to reverting back to the non-resized MC bandwidth.

Of note, the operation of MC resize is not dependent on the NMC signaling, which is followed later in the process of expansion. The workflow for MC resizing for both expansion and contraction is as follows. For expansion, the MC resizing is triggered via signaling in a forward direction on a network path, from source node 12 to destination node 12. The expanded MC is reserved on each node 12 in the network path, but not applied optically yet, e.g., to spectral filters or the like. Thus, the first stage based on forward signaling is a reservation of resources step on all of the associated nodes 12. For a second step, the MC resizing is applied optically, i.e., on the spectral filters, when the signaling traverses in the reverse direction from the destination node 12 to the source node 12. Thus, the second stage based on reverse signaling implements the resources for the resizing since all the nodes 12 in the network path have reserved the resources. Of course, if in the first stage, there is a problem at any nodes 12, the process ends (e.g., a crank back) since all of the resources are not reserved.

For contraction, the process follows similarly. First, NMC signaling (Release and Release Complete) traverses in the forward direction to remove the optical channel from the MC spectrum. Second, the MC signaling triggered to resize the MC similar to expansion, such signaling is similar to the expansion above. Again, this process can be generalized to any signaling based solution in any control plane protocol, where the service is applied or modified in the network 10 through handshake messages. The call status enquiry is applied to recover services in proper states on either end of a link over error scenarios, where the abovementioned handshake fails due to communication errors or card reboots MC Resizing Problem Definition Referring to FIG. 4, in an exemplary embodiment, a network diagram illustrates a network 100 with a plurality of interconnected nodes 102 describing the problem of MC resizing. The network 100 can be similar to the network 10 and is illustrated with the nodes 102A, 102B, 102C, 102D, 102S, 102T. The nodes 102 are interconnected by links 104, labeled as 104XY where X and Y are the nodes 102 connected by the link 104. The nodes 102S, 102T are the source and destination of an MC 110, respectively. In the exemplary operation in FIG. 4, the MC 110 is being expanded to an expanded MC 112 and the exemplary operation details a communication failure 114 in the process.

Figure 4:
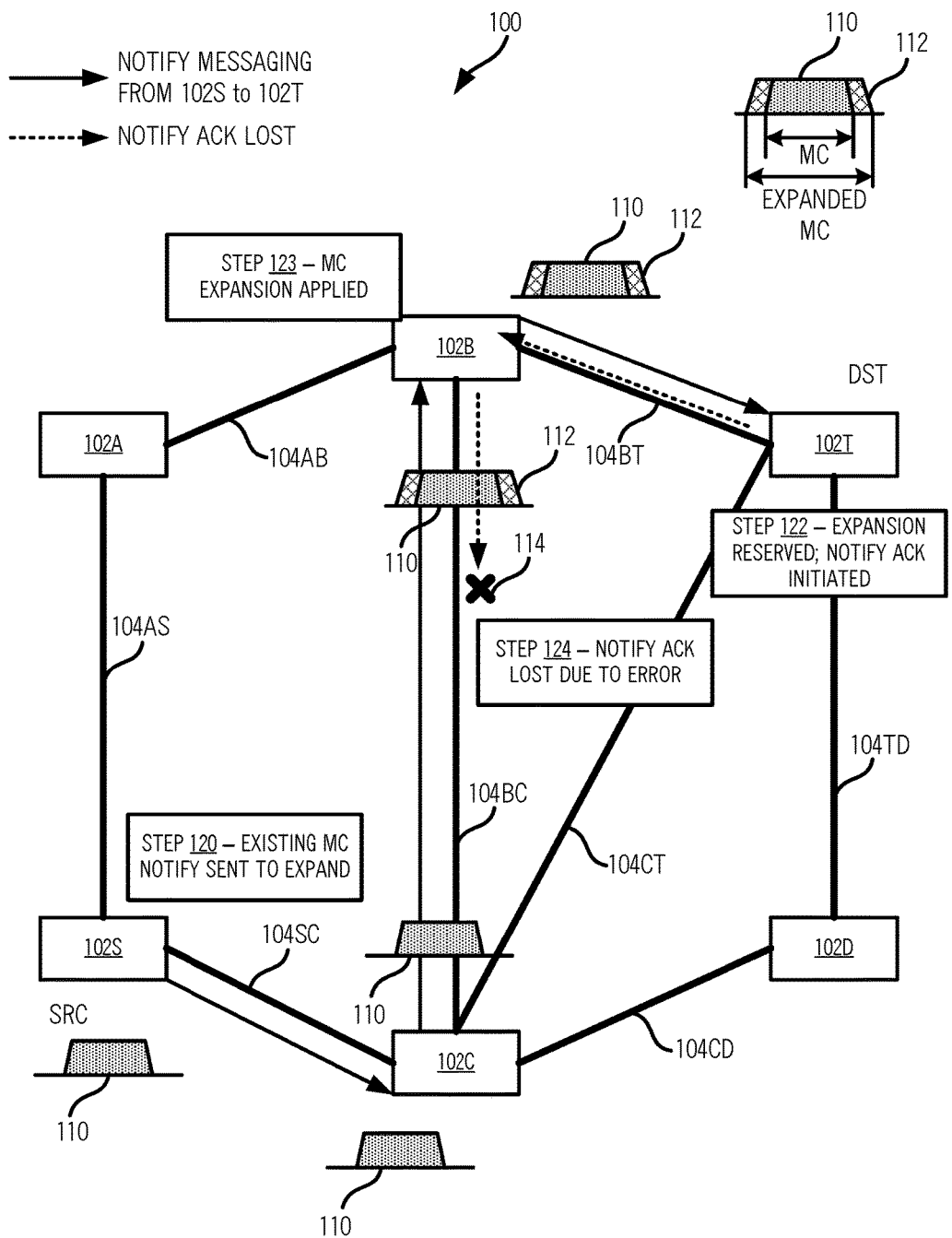
FIG. 4 is a network diagram of a network with a plurality of interconnected nodes describing the problem of MC resizing.

In FIG. 4, a request is received to expand the MC 110, and the node 102S (the source node) sends a notify message associated with the MC 110 along the path of the MC 110 (step 120). In FIG. 4, the MC 110 is provisioned between the nodes 102S, 120T via the links 104SC, 104BC, 104BT. The notify message is received sequentially at the nodes 102C, 102B, 102T and each reserves the expansion to provide the expanded MC 112. After the node 102T (the destination node) reserves the expansion, the node 102T sends a notify ACK in the reverse direction to the nodes 102B, 102C, 102S (step 122). Also, upon sending the notify ACK, the node 102T implements the change to expand to the expanded MC 112. The nodes 102B receives the notify ACK and also applies the expansion for the expanded MC 112 (step 123).

In our example, there is a communication failure 114 on the link 104BC such that the notify ACK is lost (step 124). After the link 104BC recovers, there is a mismatched size between the MC 110 on the node 102C and the expanded MC 112 on the node 102B. The head end will timeout sending the notify ACK due to the communication failure 114. Since the MC 110 is source routed, by the node 102S, the head end (the node 102S) is unaware that the resized MC 110 on the link 104BT and unidirectional link 104BC is blocked by the same service. Thus any reattempt to resize will fail unless the MC 110 is torn down.

The MC resizing operation expands/contracts the spectrum used by MC 110 on each of the nodes 102S, 102C, 102B, 102T. Due to problems described herein, the resizing operation on the path may be partial/curtailed. This may lead to same MC 110 having different allocated spectrum allocated along the path (i.e., the resizing applied at some nodes such as the nodes 102T, 102B and not applied at others such as the nodes 102C, 102S) leading to blockage of usable bandwidth and inconsistency in the object modeling at each of the nodes 102 in the control plane 14. Further operations to this MC 110, 112 could yield random results as different nodes 102S, 102C, 102B, 102T have a different context of the call. Also the differential optical power control loops on the links will have different topology leading to skew and probable higher BER and interference amongst channels.

MC Resizing Protocol Extensions

Figure 5:
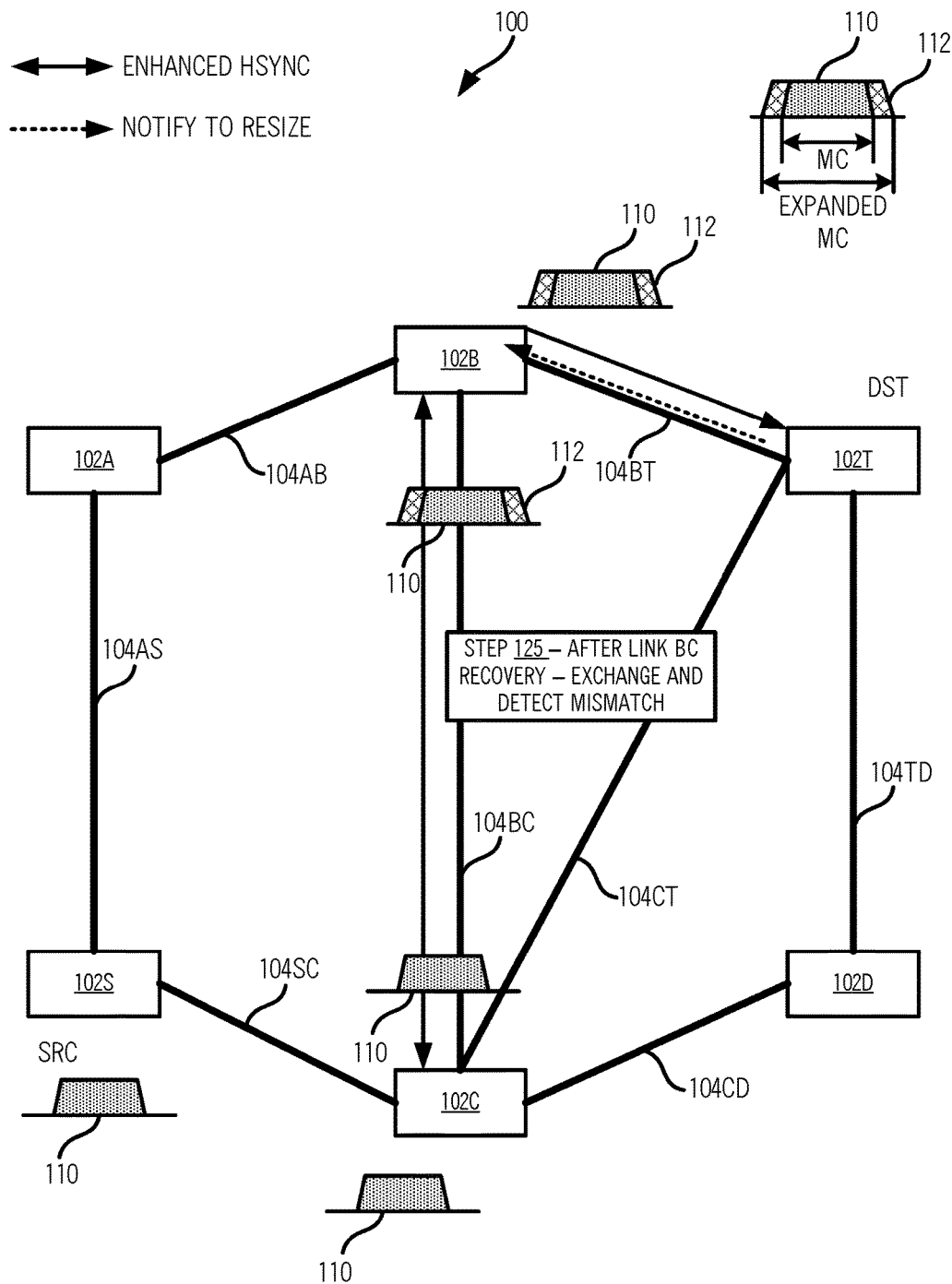
FIG. 5 is a network diagram of the network of FIG. 4 with horizontal synchronization extensions to detect and correct the mismatch from FIG. 4.

Referring to FIG. 5, in an exemplary embodiment, a network diagram illustrates the network 100 with horizontal synchronization extensions to detect and correct the mismatch from FIG. 4. Specifically, the horizontal synchronization extensions are included in the control plane 14 to correct the aforementioned issues involved in service resizing. The horizontal synchronization extensions include synchronization of the nodes 102 in the network 100 for consistency of MC definitions along the path and corrective action to bring the MC 110, 112 to a previously known stable state. The corrective action can be achieved by contracting/expanding the MC 110, 112 on each node 102S, 102C, 102B, 102T. Specifically, in FIG. 5, after the link 104BC recovers, there is a horizontal synchronization exchange, i.e., a call status enquiry, which detects the mismatch, i.e., the MC 110 at the node 102C and the expanded MC 112 at the node 102B (step 125).

The call status enquiry is enhanced/extended to check more than just the existence of the MC 110, 112 which leads to a state based synchronization between the nodes 102B, 102C. Upon detection of the mismatch, the nodes 102B, 102C are configured to implement a recovery action to revert to a last known stable service state. This recovery action is performed instead of the convention cleanup which takes down the existing traffic. In an exemplary embodiment, this approach solves this mismatch by improvements as part of the existing call status enquiry/horizontal synchronization in the control plane 14. The recovery action in FIG. 5 includes freeing up the extra/resized bandwidth from the expanded MC 112 to synchronize the spectrum occupied by the MC 110. This approach is scalable as the synchronization/audit takes place per link 104 and each audit is independent, i.e., this approach does not significantly increase the load on the control plane 14. Additionally, this approach can be extended to aggregated links, ODUflex, etc. in the network 110.

In particular, the following pseudo-code provides mismatch detection and recovery in FIG. 5: after the link 104BC recovery, exchange the states of the MCs 110, 112 and detect the mismatch as follows:

If the $STATE_B$ !=$STATE_C$, then the MC=MIN/MAX ($MC_B$, $MC_C$) for expansion/contraction respectively and trigger a notify to resize the MC. Here, $STATE_B$ is the state of the MC 112 at the node 102B, and the $STATE_C$ is the state of the MC 110 at the node 102C. In this example, the STATEs are not equal as the MC 110 at the node 102C is less than the MC 112 at the node 102B. Based on this logic, the MC should be set to the MIN($MC_C$) since this is an expansion.

Also, there can be a situation where the STATEs match, but the actual provisioned MCs do not, i.e., corrupt states. Here, $STATE_B$==$STATE_C$, but $MC_B$ !=$MC_C$, and in this scenario, the approach is to release the MC, i.e., tear down the MC at the source and redial.

Horizontal Synchronization Negotiation

Figure 6:
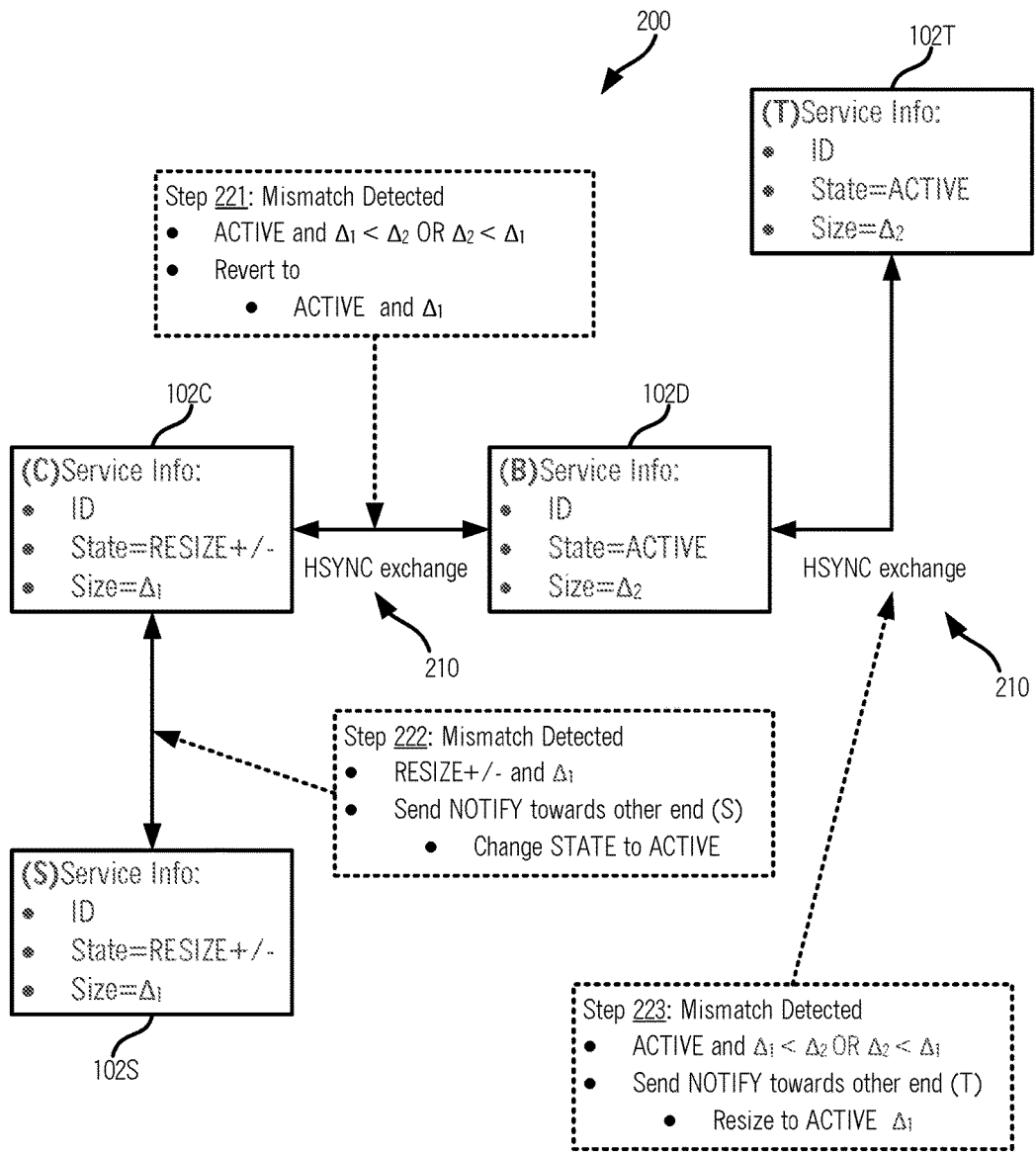
FIG. 6 is a state diagram of horizontal synchronization negotiation based on the network and the exemplary operation in FIGS. 4 and 5.

Referring to FIG. 6, in an exemplary embodiment, a state diagram illustrates horizontal synchronization negotiation 200 based on the network 100 and the exemplary operation in FIGS. 4 and 5. Specifically, each of the nodes 102S, 102C, 102B, 102T includes service information related to the MC 110, 112 provisioned thereon. For MCs, the service information can include an identifier (ID), a state (ACTIVE, INACTIVE, RESIZE+/−), and a size ($\Delta_1$, $\Delta_2$). The identifier can be a unique identifier for the MC. The state can be ACTIVE for actively operating, INACTIVE for currently inactive, or RESIZE+/− for in the midst of a resizing operation (+=expansion, −=contraction).

In the exemplary operation of FIG. 5, after the link 104BC recovers, the nodes 102D, 102T have the state=ACTIVE and the size=$\Delta_2$ which reflects the state of the expanded MC 112. However, the nodes 102S, 102C have the state=RESIZE+/− and the size=$\Delta_1$ since the notify ACK never reached these nodes 102S, 102C due to the communication failure 114. Upon recovery of the link 104BC, the nodes 102C, 102D perform horizontal synchronization with one another through a synchronization exchange 210 which can be a call status enquiry message which includes the associated service information.

Upon receiving the synchronization exchange 210, each of the nodes 102C, 102D detect a mismatch—namely, the node 102C is in a state RESIZE, and the node 102D is ACTIVE along with $\Delta_1 < \Delta_2$ OR $\Delta_2 < \Delta_1$ (step 221). Accordingly, the nodes 102C, 102D each revert to the ACTIVE state, i.e., the node 102C exits the RESIZE state and both the nodes 102C, 102D set the MC 110 size to $\Delta_1$, i.e., the last stable or good state.

Subsequently, the nodes 102C, 102S and the nodes 102B, 102T also perform the synchronization exchange 210. The nodes 102C, 102S detect a mismatch due to the RESIZE at the node 102S (the node 102C is now ACTIVE) and a notify is sent to the node 102S to change the state to ACTIVE while leaving the size as $\Delta_1$ (step 222). The nodes 102B, 102T detect a mismatch due to ACTIVE along with $\Delta_1 < \Delta_2$ OR $\Delta_2 < \Delta_1$ and a notify is sent to the node 102T to change to ACTIVE and resize to $\Delta_1$ (step 223).

Implementation with Other Service Resizing

Again, the aforementioned descriptions focus on MC resizing, but the horizontal synchronization extensions can be applied to any service that is resized in the network 10, 100 including ODUflex, Link Aggregation Groups (LAGs), and the like. The process for the synchronization exchange 210 is similar for the ODUflex, LAGs, etc. with the difference being in the related service information. For example, in the ODUflex, the size can be the size of the ODUflex and, in the LAG, the size can be the number of members.

Horizontal Synchronization Process

Figure 7:
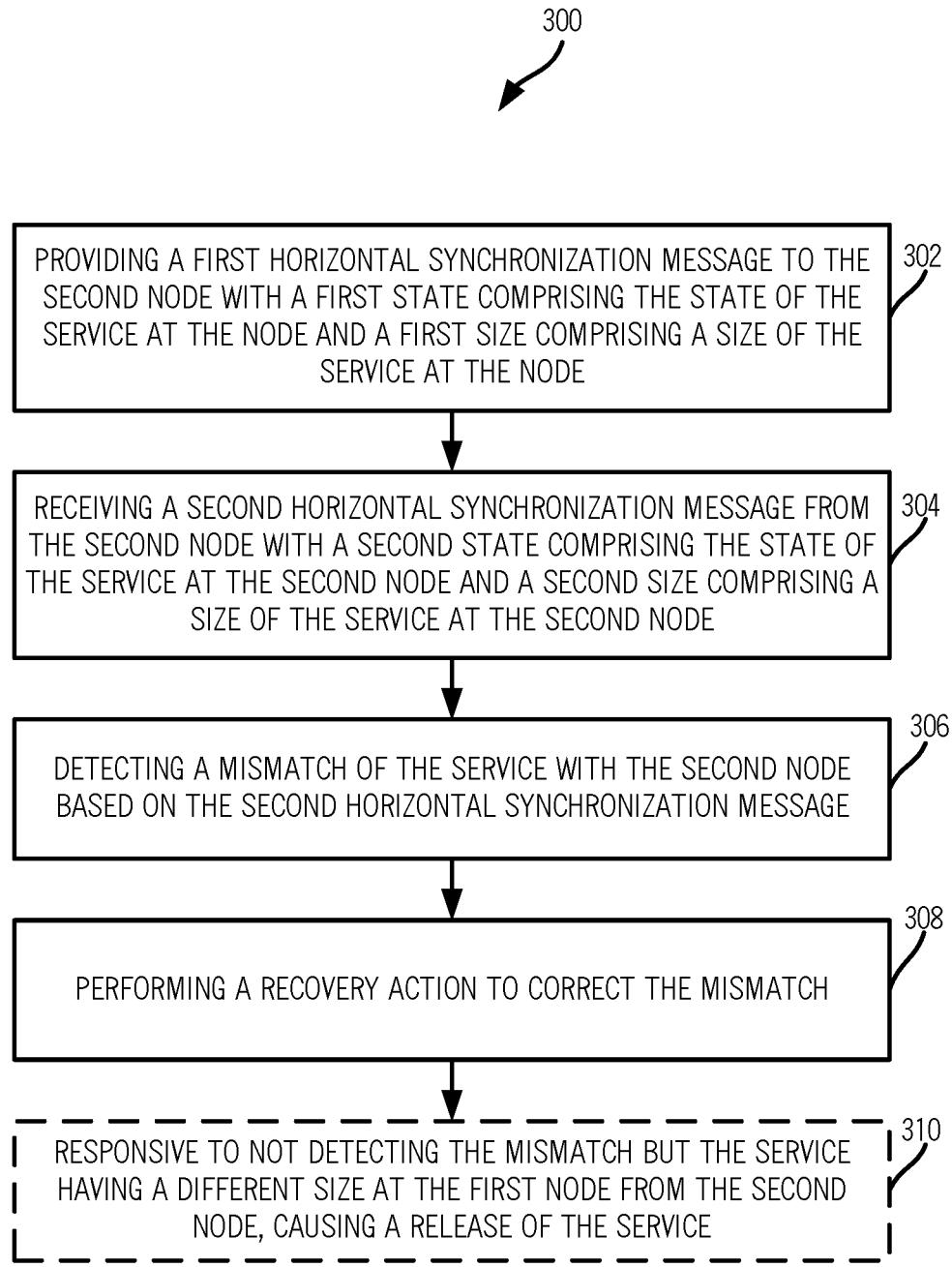
FIG. 7 is a flowchart of a horizontal synchronization process, implemented by a first node with a second node adjacent to the first node in a network with a control plane, to manage and correct for a state of a service which is resizable

Referring to FIG. 7, in an exemplary embodiment, a flowchart illustrates a horizontal synchronization process 300, implemented by a first node with a second node adjacent to the first node in a network with a control plane, to manage and correct for a state of a service which is resizable. The horizontal synchronization process 300 includes providing a first horizontal synchronization message to the second node with a first state including the state of the service at the node and a first size including a size of the service at the node (step 302); receiving a second horizontal synchronization message from the second node with a second state including the state of the service at the second node and a second size including a size of the service at the second node (step 304); detecting a mismatch of the service with the second node based on the second horizontal synchronization message (step 306); and performing a recovery action to correct the mismatch (step 308). The horizontal synchronization process 300 can further include, responsive to not detecting the mismatch but the service having a different size at the first node from the second node, causing a release of the service (step 310).

The recovery action can include causing a reversion to a last good state subsequent to a resizing operation. The service can include an optical media channel comprising a grouping of contiguous optical spectrum, wherein the optical media channel is resizable to expand or contract the grouping of contiguous optical spectrum, and wherein the size comprises an amount of the contiguous optical spectrum and the state indicates current operational state. The providing can be performed during a resizing operation subsequent to a fault during the resize operation. The service can include one of an Optical channel Data Unit flexible (ODUflex) with the size comprising a size of the ODUflex, and a Link Aggregation Group (LAG) with the size comprising a number of members in the LAG. The providing can be performed one or more of subsequent to a fault recovery and periodically. The detecting can include comparing the first state to the second state, and responsive to the first state not matching the second state, the recovery action comprises resizing the service to a last good state. The first horizontal synchronization message and the second horizontal synchronization message can include status enquiry messages in the control plane with state and size information included therein.

In another exemplary embodiment, an apparatus for horizontal synchronization to manage and correct for a state of a service which is resizable, wherein the apparatus is located at a first node in communication with a second node adjacent to the first node in a network with a control plane, includes circuitry adapted to provide a first horizontal synchronization message to the second node with a first state comprising the state of the service at the node and a first size comprising a size of the service at the node; circuitry adapted to receive a second horizontal synchronization message from the second node with a second state comprising the state of the service at the second node and a second size comprising a size of the service at the second node; circuitry adapted to detect a mismatch of the service with the second node based on the second horizontal synchronization message; and circuitry adapted to cause a recovery action to correct the mismatch.

In a further exemplary embodiment, a node in a network with a control plane communicatively coupled to a second node adjacent thereto, wherein the node is adapted to perform horizontal synchronization to manage and correct for a state of a service which is resizable, includes one or more ports; and a controller communicatively coupled to the one or more ports and adapted to provide a first horizontal synchronization message to the second node with a first state comprising the state of the service at the node and a first size comprising a size of the service at the node, receive a second horizontal synchronization message from the second node with a second state comprising the state of the service at the second node and a second size comprising a size of the service at the second node, detect a mismatch of the service with the second node based on the second horizontal synchronization message, and cause a recovery action to correct the mismatch.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented by a first node, for horizontal synchronization with a second node adjacent to the first node in a network with a control plane, to manage and correct a state of a service which is resizable, the method comprising:
    providing a first horizontal synchronization message to the second node with a first state comprising the state of the service at the first node and a first size comprising a size of the service at the first node;
    receiving a second horizontal synchronization message from the second node with a second state comprising the state of the service at the second node and a second size comprising a size of the service at the second node;
    detecting a mismatch in a size of the service with the second node based on the second horizontal synchronization message; and
    performing a recovery action to correct the mismatch causing a reversion to a last good state subsequent to a resizing operation.

2. The method of claim 1, wherein the service comprises an optical media channel comprising a grouping of contiguous optical spectrum, wherein the optical media channel is resizable to expand or contract the grouping of contiguous optical spectrum, and wherein the size comprises an amount of the contiguous optical spectrum and the state indicates current operational state.

3. The method of claim 2, wherein the providing is performed during the resizing operation subsequent to a fault in the resizing operation.

4. The method of claim 1, wherein the service comprises one of
    an Optical channel Data Unit flexible (ODUflex) with the size comprising a size of the ODUflex, and
    a Link Aggregation Group (LAG) with the size comprising a number of members in the LAG.

5. The method of claim 1, wherein the providing is performed one or more of subsequent to a fault recovery and periodically.

6. The method of claim 1, wherein the detecting comprises comparing the first state to the second state, and responsive to the first state not matching the second state, the recovery action comprises resizing the service to a last good state.

7. The method of claim 1, wherein the first horizontal synchronization message and the second horizontal synchronization message comprise status enquiry messages in the control plane with state and size information included therein.

8. The method of claim 1, further comprising:
    responsive to not detecting the mismatch but the service having a different size at the first node from the second node, causing a release of the service.

9. An apparatus for horizontal synchronization to manage and correct for a state of a service which is resizable, wherein the apparatus is located at a first node in communication with a second node adjacent to the first node in a network with a control plane, the apparatus comprising:
    circuitry adapted to provide a first horizontal synchronization message to the second node with a first state comprising the state of the service at the first node and a first size comprising a size of the service at the first node;
    circuitry adapted to receive a second horizontal synchronization message from the second node with a second state comprising the state of the service at the second node and a second size comprising a size of the service at the second node;
    circuitry adapted to detect a mismatch in a size of the service with the second node based on the second horizontal synchronization message; and
    circuitry adapted to cause a recovery action to correct the mismatch comprising a reversion to a last good state subsequent to a resizing operation.

10. The apparatus of claim 9, wherein the service comprises an optical media channel comprising a grouping of contiguous optical spectrum, wherein the optical media channel is resizable to expand or contract the grouping of contiguous optical spectrum, and wherein the size comprises an amount of the contiguous optical spectrum and the state indicates current operational state.

11. The apparatus of claim 10, wherein the first horizontal synchronization message is provided during the resizing operation subsequent to a fault in the resizing operation.

12. The apparatus of claim 9, wherein the service comprises one of
    an Optical channel Data Unit flexible (ODUflex) with the size comprising a size of the ODUflex, and
    a Link Aggregation Group (LAG) with the size comprising a number of members in the LAG.

13. The apparatus of claim 9, wherein the first horizontal synchronization message is provided one or more of subsequent to a fault recovery and periodically.

14. The apparatus of claim 9, wherein the circuitry adapted to detect is adapted to compare the first state to the second state, and responsive to the first state not matching the second state, the recovery action comprises resizing the service to a last good state.

15. The apparatus of claim 9, wherein the first horizontal synchronization message and the second horizontal synchronization message comprise status enquiry messages in the control plane with state and size information included therein.

16. The apparatus of claim 9, further comprising:
    circuitry adapted to cause a release of the service responsive to not detecting the mismatch but the service having a different size at the first node from the second node.

17. A node in a network with a control plane communicatively coupled to a second node adjacent thereto, wherein the node is adapted to perform horizontal synchronization to manage and correct for a state of a service which is resizable, the node comprising:
    one or more ports; and
    a controller communicatively coupled to the one or more ports and adapted to provide a first horizontal synchronization message to the second node with a first state comprising the state of the service at the node and a first size comprising a size of the service at the node, receive a second horizontal synchronization message from the second node with a second state comprising the state of the service at the second node and a second size comprising a size of the service at the second node, detect a mismatch in a size of the service with the second node based on the second horizontal synchronization message, and cause a recovery action to correct the mismatch comprising a reversion to a last good state subsequent to a resizing operation.

* * * * *